No. 711,951. Patented Oct. 28, 1902.
J. DRUM & M. DOYLE.
HARNESS.
(Application filed Apr. 25, 1902.)

(No Model.)

Witnesses
James Drum and
Michael Doyle
Inventors
by Farrell & Lawson
Attorneys

THE NORRIS PETERS CO., PHOTO-LITHO., WASHINGTON, D. C.

UNITED STATES PATENT OFFICE.

JAMES DRUM AND MICHAEL DOYLE, OF BRAZIL, INDIANA.

HARNESS.

SPECIFICATION forming part of Letters Patent No. 711,951, dated October 28, 1902.

Application filed April 25, 1902. Serial No. 104,673. (No model.)

*To all whom it may concern:*

Be it known that we, JAMES DRUM and MICHAEL DOYLE, citizens of the United States, residing at Brazil, in the county of Clay and State of Indiana, have invented certain new and useful Improvements in Harness, of which the following is a specification, reference being had therein to the accompanying drawings.

Our invention relates to new and useful improvements in harness especially adapted to use on draft-animals in mines and other places having low and uneven walls; and its object, among other things, is to provide a simple and inexpensive harness which is constructed principally of metal, and thereby rendered extremely durable in spite of the constant friction upon the walls to which it is subjected.

Another object of the invention is to render the parts readily adjustable to the animal to which it is secured.

With the above and other objects in view the invention consists in the novel construction and combination of parts hereinafter more fully described and claimed, and illustrated in the accompanying drawings, showing the preferred form of our invention, and in which—

Figure 1:
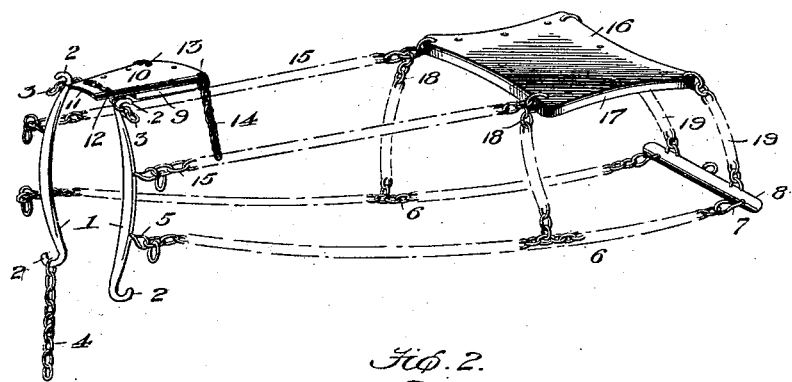
Figure 2:
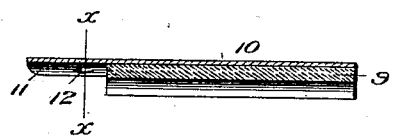
Figure 6:
Figure 3:
Figure 7:
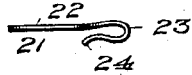
Figure 4:
Figure 5:
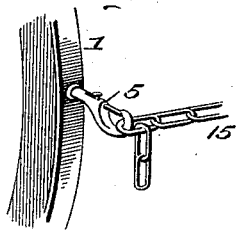

Figure 1 is a perspective view of the harness. Fig. 2 is a central longitudinal section through the shoulder-pad of the harness. Fig. 3 is a section on line $x\,x$, Fig. 2. Fig. 4 is a transverse section through one end of the back-pad. Fig. 5 is an enlarged detail view of a portion of a hame and the chain-securing means thereon. Fig. 6 is a perspective view of a securing-hook for the chain, and Fig. 7 is a side elevation of said hook.

Referring to the figures by numerals of reference, 1 1 are the hames, having outwardly-curved hooks 2 at the ends, which are adapted to be engaged by chains 3 and 4, extending across the top and bottom, respectively. Snap-hooks 5 are arranged intermediate the ends of each hame, and the lower ones engage links of chain tugs or traces 6, extending backward to hooks 7, extending from a tree 8.

A shoulder-pad 9, of any suitable material, is provided on its upper surface with a metal plate 10, extending forward therefrom, as shown at 11. This forward extension is provided at each side with an aperture 12, adapted to receive the upper chain 3, before referred to, whereby the pad is secured to the hames. The rear corners of the plate 10 are also provided with apertures 13, which are engaged by the end of chains 14, extending downward to and supporting chains 15. These chains 15 are detachably secured at their forward ends to the upper hooks 5 of the hames, and their rear ends are detachably fastened to the corners of a metal plate 16, secured upon the upper or top surface of a back-pad 17. Side chains 19 support the traces 6 from the chains 15, and a second set of chains 18 extend from the rear corners of plate 16 to the tree 8. As shown in Fig. 4, the pad 17 is cut away under the apertures 20, formed in plate 16. This is to permit the said apertures to receive suitable means for securing the chains 18 and 19 to the plate. In Fig. 1 we have shown ordinary links fastened within the apertures 20; but we preferably employ detachable hooks of the form illustrated in Figs. 6 and 7 in lieu thereof. These hooks 21 are struck from heavy spring metal and comprise, respectively, a perforated body 22 and an inwardly-curved hook 23 at one end thereof. The aperture in the body is adapted to receive the end link of a chain, and the hook 23 engages an aperture 20 in the plate. The inwardly-curved end 24 of each hook prevents the accidental withdrawal of the hook from its aperture. Hooks 21 may also be employed at the upper ends of the chains 14.

It will be seen that the pads 9 and 17 extend a sufficient distance below their respective plates to hold the ends of the chains out of contact with the body of the animal. By providing snap-hooks 5 the chains 6 and 15 may be taken up a desired distance, and the harness can thus be fitted to any size animal. The hames are also adjustable from or toward each other by placing desired links of the chains 3 and 4 in engagement with hooks 2.

In the foregoing description we have shown the preferred form of our invention; but we do not limit ourselves thereto, as we are aware that modifications may be made therein without departing from the spirit or sacrificing the advantages thereof, and we therefore reserve the right to make such changes as fairly fall within the scope of our invention.

Having thus fully described our invention, what we therefore claim as new, and desire to secure by Letters Patent, is—

1. In a harness the combination with hames; of hooks formed at the ends of the hames, chains connecting and detachable from the hooks, a shoulder-pad, a plate secured thereon, and a perforated extension to the plate engaged by one of said chains.

2. In a harness the combination with hames having hooks thereon; of chains adjustably secured to the hooks and connecting the hames, a shoulder-pad, a plate secured thereon, a perforated extension to the plate engaged by one of said chains, a back-pad, a perforated plate thereon, and chains connecting said plate and the hames.

3. In a harness the combination with hames having hooks at the ends thereof; of chains adjustably connecting the hames and secured to the hooks, a shoulder-pad, a metal plate secured thereon, an extension to said plate engaged by one of the chains, a back-pad, a plate secured thereon, chains adjustably and detachably secured to the hames and the plate of the back-pad, a tree, chains connecting the tree and hames and the tree and back-pad, and supporting-chains connected to the pads.

In testimony whereof we affix our signatures in presence of two witnesses.

JAMES DRUM.
MICHAEL DOYLE.

Witnesses:
PATRICK MCQUADE,
CHAS. E. DWYER.